United States Patent [19]

Herrington

[11] Patent Number: 4,721,501
[45] Date of Patent: Jan. 26, 1988

[54] APPARATUS FOR PRODUCING A MACHINE-DIRECTION HEAT SEAL

[75] Inventor: Fox J. Herrington, Holcomb, N.Y.

[73] Assignee: Mobil Oil Corporation, New York, N.Y.

[21] Appl. No.: 904,444

[22] Filed: Sep. 8, 1986

[51] Int. Cl.⁴ .................. B31B 23/64; B31B 23/86
[52] U.S. Cl. ......................... 493/193; 493/208; 493/225; 493/394; 493/928; 156/582; 156/583.1; 156/583.4
[58] Field of Search ............... 493/205, 206, 207, 208, 493/209, 189, 190, 191, 192, 193, 197, 202, 225, 226, 381, 386, 394, 406, 470, 471, 928; 156/582, 583.1, 583.4, 583.7, 583.8, 583.9, 583.91

[56] References Cited

U.S. PATENT DOCUMENTS

| | | | |
|---|---|---|---|
| 2,125,758 | 8/1938 | Waters | 493/197 |
| 2,242,799 | 5/1941 | Moore | 493/208 |
| 2,358,455 | 9/1944 | Hallman | 493/205 |
| 2,609,317 | 9/1952 | Vogt | 493/206 |
| 2,741,956 | 4/1956 | Diffenbaugh | 493/208 |
| 2,897,729 | 8/1959 | Ashton et al. | 493/196 |
| 2,971,874 | 2/1961 | Canno | 493/197 |
| 2,998,842 | 9/1961 | Good | 156/583.4 |
| 3,029,853 | 4/1962 | Piazze | 383/75 |
| 3,058,402 | 10/1962 | Kugler | 493/196 |
| 3,058,403 | 10/1962 | Kugler | 493/194 |
| 3,406,610 | 10/1968 | Golden | 493/196 |
| 3,414,032 | 12/1968 | Jortikka | 383/26 |
| 3,484,325 | 12/1969 | Pendleton | 156/583.4 |
| 3,759,772 | 9/1973 | Andersson | 156/270 |
| 3,935,048 | 1/1976 | Rucker | 493/205 |
| 4,140,046 | 2/1979 | Marbach | 493/209 |
| 4,202,721 | 5/1980 | Roberts | 156/358 |

FOREIGN PATENT DOCUMENTS

| | | |
|---|---|---|
| 2732085 | 1/1979 | Fed. Rep. of Germany ... 156/583.1 |
| 2833119 | 2/1980 | Fed. Rep. of Germany ... 156/583.1 |
| 1125363 | 8/1968 | United Kingdom . |

Primary Examiner—Frederick R. Schmidt
Assistant Examiner—William E. Terrell
Attorney, Agent, or Firm—Alexander J. McKillop; Michael G. Gilman; Charles J. Speciale

[57] ABSTRACT

Apparatus for producing a machine-direction heat seal in a moving web of plastic film including a block adapted to be supported on one side of the hem and having a plurality of rollers mounted thereon at spaced locations in tandem for engaging the film along the path of the heat seal to be formed in the hem. The block has a corresponding plurality of surfaces each of which is adapted to be engaged by a side of one of the rollers. A heater is provided for heating the block and its plurality of surfaces and the rollers are maintained in contact with the plurality of surfaces whereby movement of the hem though the heat sealing apparatus causes the plurality of rollers to rotate and maintain contact with the plurality of surfaces whereby the rollers are in turn heated by conduction from the block and produce the heat seal in the hem.

11 Claims, 15 Drawing Figures

APPARATUS FOR PRODUCING A MACHINE-DIRECTION HEAT SEAL

BACKGROUND OF THE INVENTION

This invention relates to apparatus producing a machine-direction heat seal for sealing a hem in a moving web of film and more particularly to the manufacture of draw tape plastic bags.

Bags made of thin polyethylene materials have been used in various sizes. Small bags are used in the packaging of samples and the like. Larger bags are used as shopping bags; and even larger bags are used for containing trash.

A particularly advantageous closure for such a bag includes a draw tape constructed from the same polyethylene material. U.S. Pat. No. 3,029,853—Piazzi and British patent No. 1,125,363—Jortikka are examples of draw tape bags. Such closures have been successfully employed on these bags.

Draw tape closures for large trash bags, and the manufacture of these draw tape trash bags, are described in the related applications identified below.

Forming the hem, into which the tape is inserted, is shown for example, in U.S. Pat. Nos. 2,897,729—Ashton et al 3,058,402—Kugler, 3,058,403—Kugler, and in copending patent applications of applicant's assignee including "METHOD AND APPARATUS FOR FORMING HEMS IN SUPERPOSED PLIABLE PANELS," Boyd et al, Ser. No. 652,255, filed Sept. 20, 1984, now U.S. Pat. No. 4,617,008; and in "HEM FOLDER WITH INTEGRAL TAPE INSERTER FOR MAKING DRAW TAPE BAGS," Herrington, Ser. No. 871,238 filed June 6, 1986.

Draw tape hems have been previously made by various methods. One method is to use a Teflon-coated hot bar which opens and closes against the film in the area of the bag machine where the film starts and stops. The bar closes once during each cycle while the film is stopped. A second method is to blow a series of hot air jets against the film as it travels by. Bag closures for use in the field use a pair of heated belts to produce a machine-direction seal. In the hot bar method, the hot bar is located far downstream from where the tape is inserted into the hem and also where the hem is folded, so there has been an opportunity for the tape and the hem to wander by the time it reaches the sealer. This requires making the hem wider to allow for this wandering movement. This is costly in wasted material, produces a weak tape seal at the side edges of the bag, and also makes a sloppy bag. The hot air sealer can be used on a continuously moving web, but it is very sensitive to wrinkles. The heating of the film by the air jets also causes some wrinkling which cannot easily be prevented since the film is not mechanically constrained. As a result the hem seals made by these techniques are not reliable, particularly where thin films, in the order of one mil, are used.

It is an object of the present invention to seal a hem in a web of film moving at a relatively high speed, such as 250-300 ft./min, where the seal in the hem is produced as close as possible to where the hem is folded and the tape inserted, and while the film is still held flat on the folding surface so there are no wrinkles in the hem.

It is a further object of the present invention to seal hems in the opposing panels of a moving web of folded thermoplastic film in the manufacture of draw tape bags.

RELATED APPLICATIONS

METHOD AND APPARATUS FOR MANUFACTURING DRAW TAPE, BAGS, Boyd, et al, Ser. No. 652,254, filed Sept. 20, 1984, now U.S. Pat. No. 4,624,654, describes an overall draw tape bag manufacturing line; METHOD AND APPARATUS FOR FORMING HEMS IN SUPERPOSED PLIABLE PANELS, Boyd et al, Ser. No. 652,255, filed Sept. 20, 1984, now U.S. Pat. No. 4,617,008, describes a hem forming apparatus used with the line; INSERTION OF DRAW TAPE STRIPS IN DRAW TAPE BAG MANUFACTURE, Boyd et al, Ser. No. 652,252, filed Sept. 20, 1984, now U.S. Pat. No. 4,597,750, describes apparatus for inserting a draw tape into the bag; HEM FOLDER WITH INTEGRAL TAPE INSERTER FOR MAKING DRAW TAPES, Herrington, Ser. No. 871,238 filed June 6, 1986, describes apparatus for folding a hem and inserting a draw tape into the bag; APPARATUS FOR SEALING A HEM IN A MOVING WEB OF FILM USING ANGULARLY ORIENTED HOT WHEELS, Herrington et al, Ser. No. 904,449 filed concurrently herewith; APPARATUS FOR SEALING A HEM IN A MOVING WEB OF FILM, Herrington, Ser. No. 904,441 filed concurrently herewith.

SUMMARY OF THE INVENTION

In accordance with the present invention there is provided apparatus for producing a machine-direction heat seal in a moving web of thermoplastic film. The apparatus comprises means adapted to be supported on one side of the web including a plurality of rollers mounted at spaced locations in tandem for engaging the film along the path of a heat seal to be formed in the web. Means is also provided for heating the plurality of rollers whereby movement of the web through the heat sealing apparatus causes the plurality of rollers to rotate and produce the heat seal in the web. The apparatus also includes means supported on the opposite side of the web for engaging the film along the path of the heat seal to be formed in the web and cooperating with the rollers in creating the heat seal. The foregoing apparatus preferably is incorporated in a machine for making bags from thermoplastic film wherein the apparatus for heat sealing a pair of hems in a moving web of the film comprises a first support means adapted to be supported on one side of one of the hems. A plurality of rollers is mounted on the first support means at spaced locations in tandem for engaging the film along the path of the heat seal to be formed in the one hem. A second support means is adapted to be supported on one side of the second hem, the second support means having a plurality of second rollers mounted thereon at spaced locations in tandem for engaging the film along the path of a second heat seal to be formed in the second hem. Means is also provided for heating each of the plurality of rollers whereby movement of the hems through the heat sealing apparatus causes the plurality of rollers to rotate and produce the heat seals in the hems.

The foregoing and other objects, features and advantages of the invention will be better understood from the following, more detailed description and appended claims.

The foregoing and other objects, features and advantages of the invention will be better understood from

DESCRIPTION OF SPECIFIC EMBODIMENTS

Figure 1:
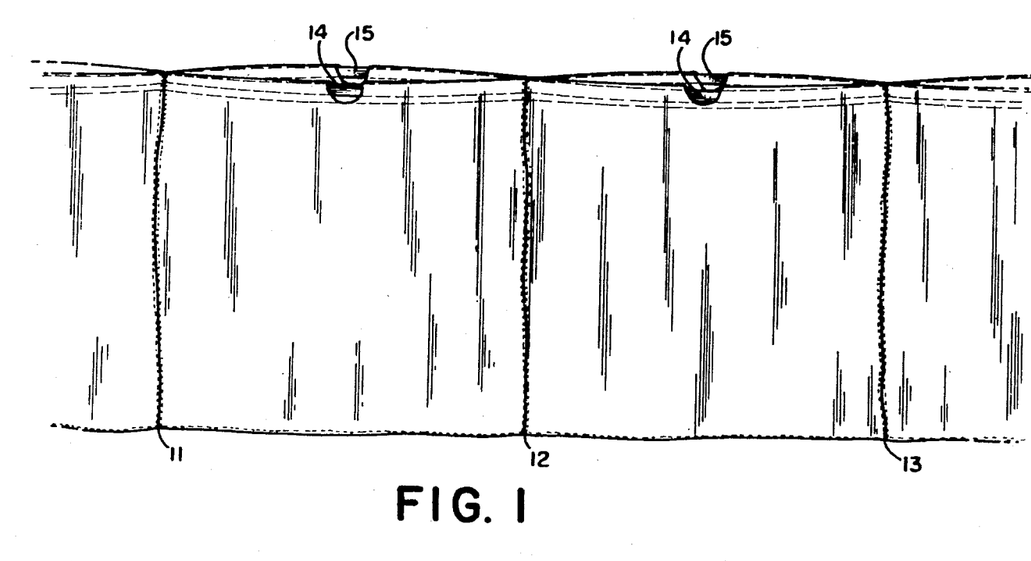
FIG. 1 shows a series of draw tape bags made in accordance with the present invention.

FIG. 1 shows a series of draw tape bags formed from an extruded tube of polyethylene. The tube is slit along one side to form open tops in the bag for reception of trash and the like. The tube of film is folded along the other side to form the bag bottoms. The sides of the panels are heat sealed and cut from the tube in a perpendicular direction at 11, 12 and 13 to form individual bags.

Hemmed portions of each opposing panel are folded over adjacent the top. The draw tape bag construction as thus far described has hemmed portions that are narrower resulting in a saving of material and thus reduction in overall cost as later to be described in detail. Draw tapes 14 and 15 are inserted in the hems and are secured by the heat seal at the sides of the panels. Tape holes are cut in each panel exposing the draw tape so that they can be grasped. The distance from the bottom of the bags to the top is referred to as "web width" or "bag length" herein.

Figure 2:
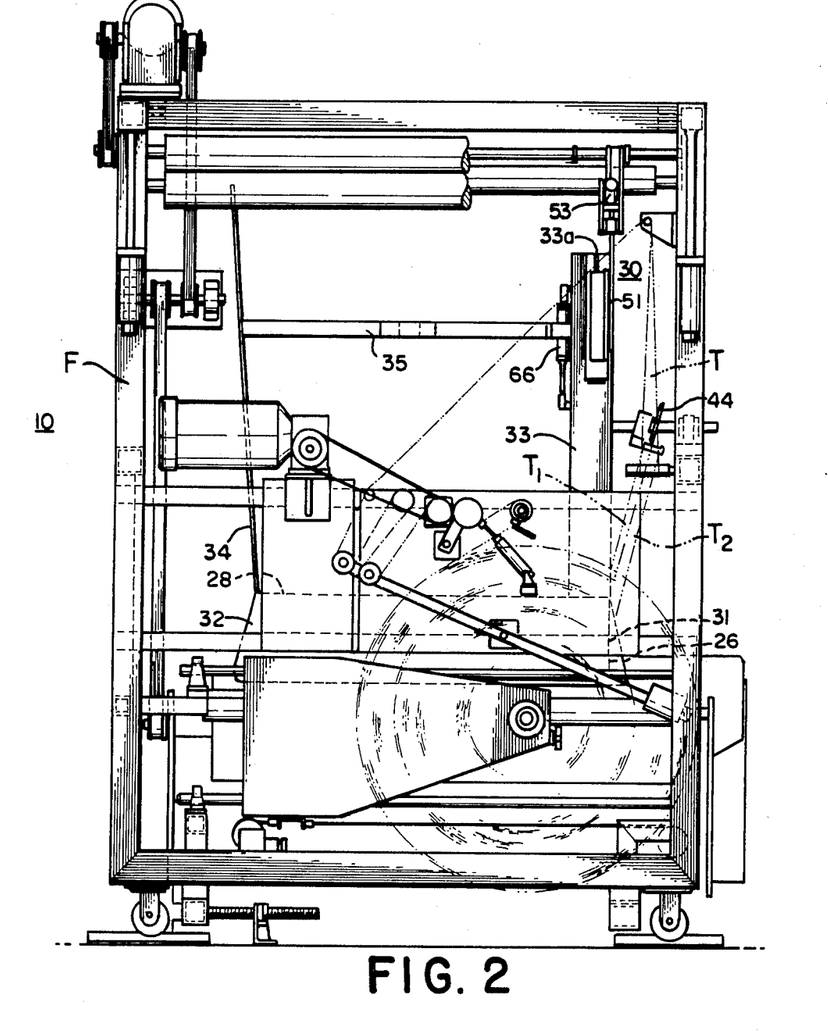
FIG. 2 is a side elevation view of a machine embodying the hem sealing apparatus of the present invention.
Figure 3:
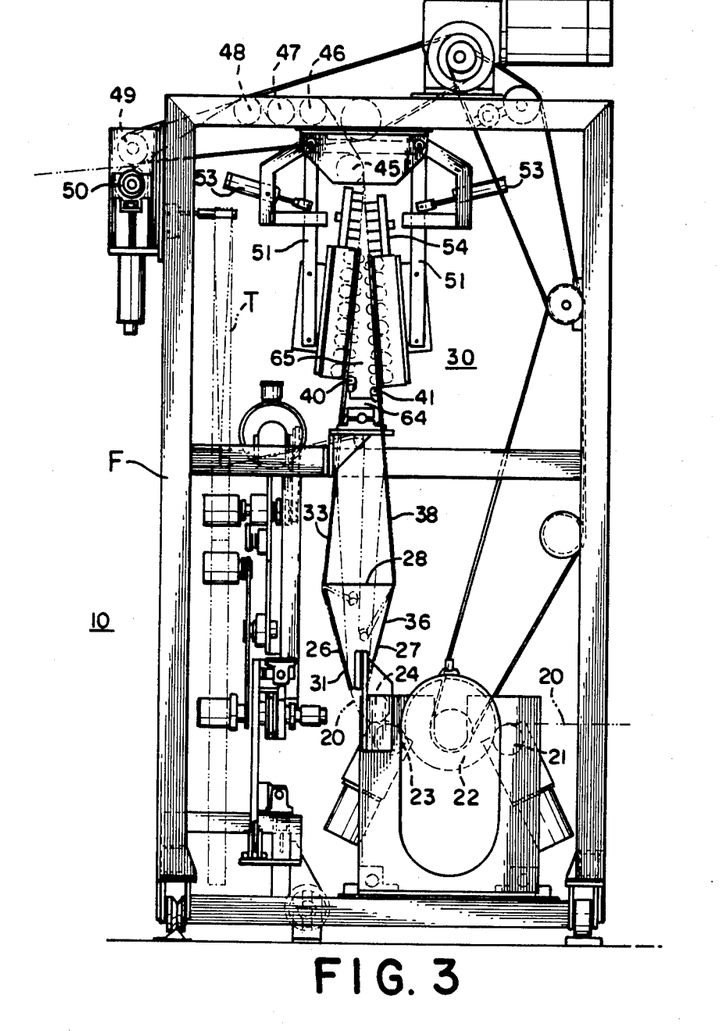
FIG. 3 is a front elevation view of the machine of FIG. 2.

FIGS. 2 and 3 illustrate a machine 10 embodying the apparatus of the present invention for sealing a hem in a moving web of film. A moving web of film 20 is formed from an extruded tube of polyethylene which has been slit on the side facing the viewer in FIG. 3 and folded on the other side to form two opposing layers of film. This moving web 20 enters the machine 10 through rollers 21, 22, 23 and 24, with the roller 23 having punch elements which form the holes for grasping the tape.

The hem forming apparatus illustrated in FIGS. 2 and 3 includes supporting structure F having two folding surfaces 26 and 27 which are flat and converge outwardly from the feed rolls 21–24 to a point of maximum separation at 28 and then converge inwardly to a point of close separation adjacent the hem sealing apparatus 30. The folding surface 26, FIG. 2, is made up of a lower hem plate 31, a lead-in plate 32, an upper hem plate 33 and the edge of a bottom plate 34 which is separated from the upper hem plate 33 by a spacer 35 and the lead-in plate 32. The lead in plate 32 and the lower hem plate 31 are both in the same plane and diverge outwardly to the point 28 as shown in FIG. 3. The other surface 27 includes a lower hem plate 36, a lead in plate similar to plate 32 and in the same plane as plate 36, an upper hem plate 38 and the opposite edge of the bottom plate 34. The bottom plate 34 is triangularly shaped having its base along the line 28 in FIG. 3 and its apex adjacent the upper end of the hem plates 33 and 38.

When the web 20 impinges on the surfaces 26 and 27, FIG. 3 the folded edge of the web 20 which is to form the bottom of the bags will pass over the bottom plate 34 as shown in FIG. 2. A layer of the film passes over the outside of each of the surfaces 26 and 27 and the split edges of the film are tucked onto the other side of each surface to produce a hem in each opposing layer of film. The rollers 40, 41, FIGS. 3 and 4, supported in relation to the hem plates 33 and 38 maintain the moving web of film tightly around the respective surfaces 26 and 27 and against the opposite sides thereof to avoid formation of wrinkles in the film during the heat sealing of the hems, FIGS. 3 and 4.

Slots, not shown, are provided in the lower hem plates 31 and 36, to receive the tapes T1 and T2 which are inserted into the hems of the moving web of film. A tape splitter 44 produces the two tapes T1 and T2 from a single tape T. The hem sealing apparatus 30 seals the folded over hem portion to the side panel of the bag so that the draw tape is secured in the hem of the bag. After the film leaves the hem sealing apparatus 30 it passes through nip rolls 46–48 and then through rolls 49 and 50 to the further processing steps of side sealing and cutting into individual bags. The present invention is concerned with the improved apparatus for sealing a hem in a moving web of film while the web is moving and preferably prior to the hem leaving the hem folding surface.

Figure 4:
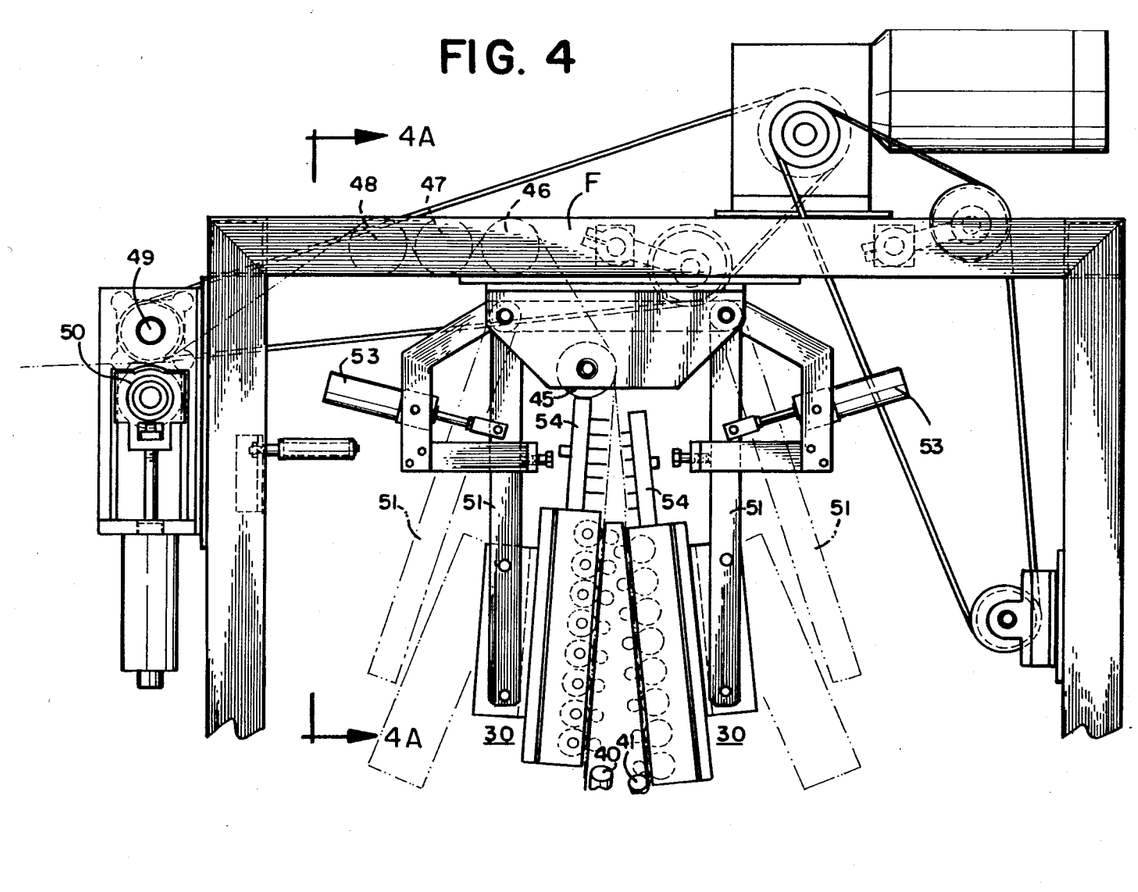
FIGS. 4 is a fractional view on enlarged scale of the upper portion of the machine embodying the hem sealing apparatus shown in FIG. 3.
Figure 4A:
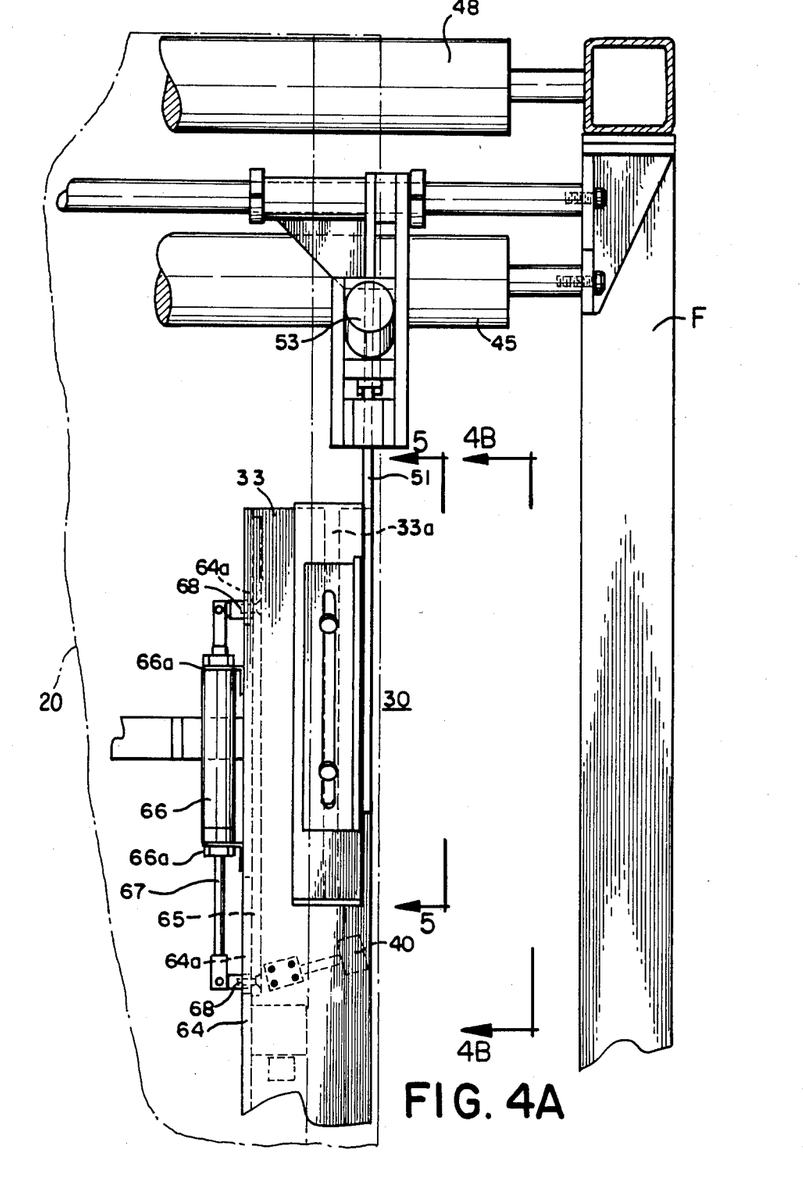
FIG. 4A is a fractional view on enlarged scale taken along the 4A—4A in FIG. 4.
Figures 4B, 5A:
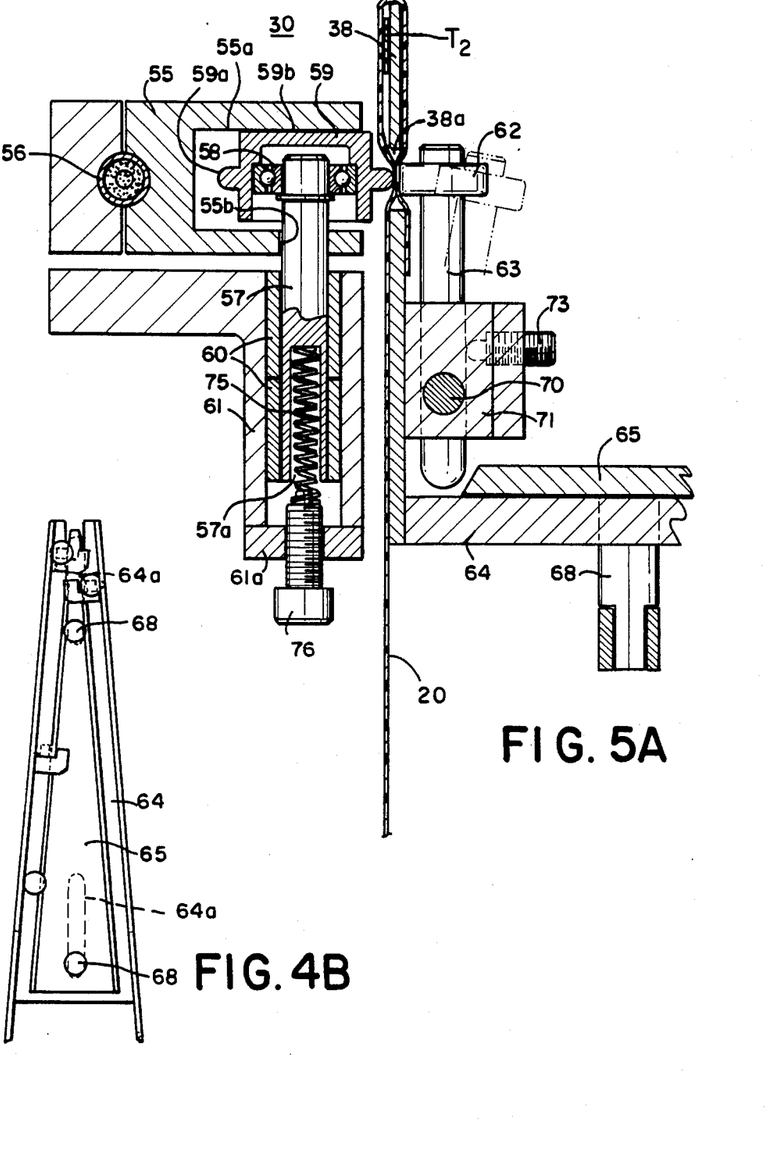
FIG. 4B is a fractional view taken along the lines 4B—4B in FIG. 4A.
FIG. 5A is a cross-sectional view taken along the lines 5A—5A in 5.
Figure 5:
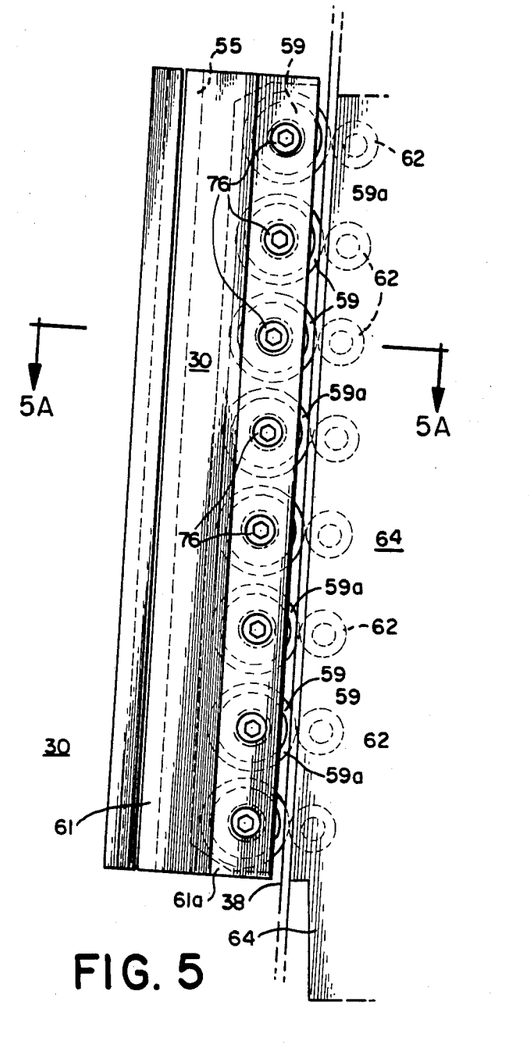
FIG. 5 is an elevational view of the hem sealing apparatus shown FIG. 4A taken along the lines 5—5.

As shown in FIGS. 2 and 4A the upper hem plate 33 has an opening in the form of a longitudinal slot 33a therein near the upper end of the plate. The other hem plate 38 has a similar opening or slot 38a therethrough and both of these openings are positioned in alignment with the heat sealing apparatus 30. The heat sealing apparatus 30 comprises two similar sealing units, one mounted with respect to each of the upper hem plates 33 and 38, FIGS. 2–4A. As may be seen in FIG. 4 the sealing units of the heat sealing apparatus 30 are carried by adjustable brackets 51 which depend from a stationary bracket 52 secured to the top of the frame F. The adjustable brackets 51 are adapted to be moved between their full line position and their broken line position in FIG. 4 by means of actuators 53 in the form of air cylinders. When the brackets 51 are in full line position as shown in FIG. 4 the respective sealing units of the heat sealing apparatus 30 are in fixed position with respect to the upper hem plates 33 and 38. This is the normal operating position for the heat sealing units during the manufacture of the draw tape plastic bags. After the heat sealed hems leave the heat sealing apparatus 30 they pass between cooling members 54 which comprise a plurality of air jets for directing cooling air against the heat sealed areas of the seams to cool the seams so as to prevent stretching of the film as it is pulled over roll 45 and through rolls 46-50 to the further processing steps of side sealing and cutting into individual bags. The details of one embodiment the heat sealing apparatus are best seen in FIGS. 5 and 5A where they are illustrated in connection with the hem plate 38. As may be seen in FIG. 5A the heat sealing apparatus 30 includes a heating block 55 through which extends an electric heating element 56 which preferably is thermostatically controlled to control the temperature of the block 55. The block 55 is provided with a plurality of openings 55b, FIG. 5A, through which extend a corresponding number of shafts 57 on which are mounted ball bearings 58 and on which in turn are mounted rollers or wheels 59. Each of the rollers 59 is provided with an annular projection or rim 59a the purpose of which will be hereinafter described. The shafts 57 are mounted in sleeve bearings 60 within a housing 61 having an end plate 61a. The housing 61 is mounted with respect to the hem plate 38 such that the projections 59a on the wheels 59 are in alignment with an extend into the slot 38a on the hem plate 38. Mounted at the opposite side of the hem plate 38 and in alignment with the slot 38a is a plurality of rubber rollers 62, one being shown in FIG. 5A, which are spring biased and are adapted to extend into the slot 38a and cooperate with the corresponding plurality of rollers 59 in heat sealing the hem in the web.

As may be seen in FIGS. 3, 4A and 4B the hem plates 33 and 38 are maintained in spaced relation by a plate 64 on which is mounted an adjustable wedge 65 which is adapted for vertical movement by an air cylinder 66, FIG. 2. The air cylinder 66 is mounted on the plate 64. The opposite ends of a rod 67 in the air cylinder are connected to the wedge 65. When the air cylinder 66 is actuated, the plunger 67 may move the wedge 65 vertically a predetermined distance. As may be seen in FIG. 5A the sides of the wedge 65 are beveled and adapted to engage the ends of the shafts 63 which carry the rollers 62. The shafts 63 are carried by pivots 70 which in turn are carried by blocks 71 secured to the hem plates, as illustrated by hem plate 38 in FIG. 5A. The blocks 71 also are provided with spring loaded detents 73 which engage the shafts 63 for the rollers 62. The spring loaded detents are adjustable so as to vary the amount of spring loading on the shafts 63. When the wedge 65 is moved upwardly from its position shown in FIGS. 4A and 4B, the wedge engages the ends of the shafts 63 causing the rollers 62 to be moved out of engagement with the web and thus out of the slot 38a as shown in phantom lines in FIG. 5A. While the forgoing arrangement has been described in connection with the hem plate 38, it is to be understood that similar parts both for the heated rollers 59 and the rubber backup rollers 62 are utilized in connection with the other hem plate 33.

By the time the web of film 20 has moved upwardly over the folding surfaces 26 and 27, FIGS. 2 and 3, the layer of the film moving over the surface 27 will have moved onto the folding plate 38 where the film is folded around the edge of the plate 38 to form a hem with a tape T2, FIG. 5A inserted therein as previously described. When the hem reaches the lower end of the sealing apparatus 30, FIGS. 3, 4 and 5, the projections 59a on the heated rollers 59 cooperate with the spring biased rubber rollers 62 to engage the opposite sides of the hem and form a heat seal longitudinally of the web.

The wheels 59 are heated by means of conduction from the heater block 55, the temperature of which is thermostatically controlled by the heating element 56, FIG. 5A. As may be seen in FIG. 5A, the shaft 57 is provided with a bore 57a which is adapted to receive a compression spring 75. The end plate 61a has a threaded opening into which extends an adjustable screw 76 which is adapted to engage the end of the compression spring 75. The opposite end of the compression spring 75 engages the shaft 57 at the end of the bore 57a and thus by adjusting the screw 76 the compression the spring 75 can likewise be adjusted thereby forcing the shaft 57 in an upward direction as viewed in FIG. 5A. This causes the wheel 59 to have its flat face 59b maintained in engagement with the inner wall 55a of the heater block 55. The force of the spring 75 maintains the face of the wheels 59 in contact with the heater block 55 thus ensuring heat transfer from the heater block 55 to each wheel 59. The adjustable screws 76 have the advantage of being able to minimize the longitudinal force applied to the shafts 57 while maintaining good thermal contact between the wheels 59 and the heater block 55. The heater block 55 is shaped to provide a housing for the wheels 59 to concentrate the heat around the wheels. As may be seen in FIG. 5 eight wheels 59 are utilized in sealing the hem. By using a plurality of heat sealing rollers or wheels 59, the heat required for sealing the hem can be delivered to the film in smaller increments since eight wheels are supplying the heat rather than one. If only one wheel were being utilized it would be necessary to heat the single wheel to higher temperature or to operate the speed of the film at a slower speed in order to complete the seal.

It has been determined by calculation that the creation of a seal 3/16" wide at 300 ft./min. on two layers of 1.3-mil film requires the transfer of 7 Btu/min of heat into the film. This same amount of heat must likewise be transferred from the heated block into the wheel. This cannot readily be done by hot air or by transfer through the bearings of the wheel. In accordance with the present invention hem seals were made at about 300 ft/min. speed using eight wheels, 1½" diameter, in tandem, heated to a temperature of 300°-350° F. The wheels 59 were hard anodized aluminum having Teflon coated surfaces on the rims 59a and the sides or faces 59b of the wheels which engage the Teflon coated surfaces 55a on the aluminum block 55. The rims 59a had a radius of 3/32". The eight backup wheels were ¾" diameter, 40-durometer natural rubber rollers, although silicone rubber may be preferred for durability. Since two hems are being sealed simultaneously (one for the front and one for the back of the bag) and since it is desirable to separate the layers of film as little as possible, the ¾" backup rolls 62 are alternated inside the opening between film layers, FIGS. 3 and 4, so that every other roll 62 is used as the backup for the hot wheels sealing the front of the bag, and alternate wheels are used for backup for the hot wheels 59 sealing the back of the bag. In that way, it is only necessary to separate the film layers by just over ¾". While a flat anvil backup means may be used in cooperation with the heated rollers, it has been found that the individual rubber rollers provides smoother seals.

Figure 6:
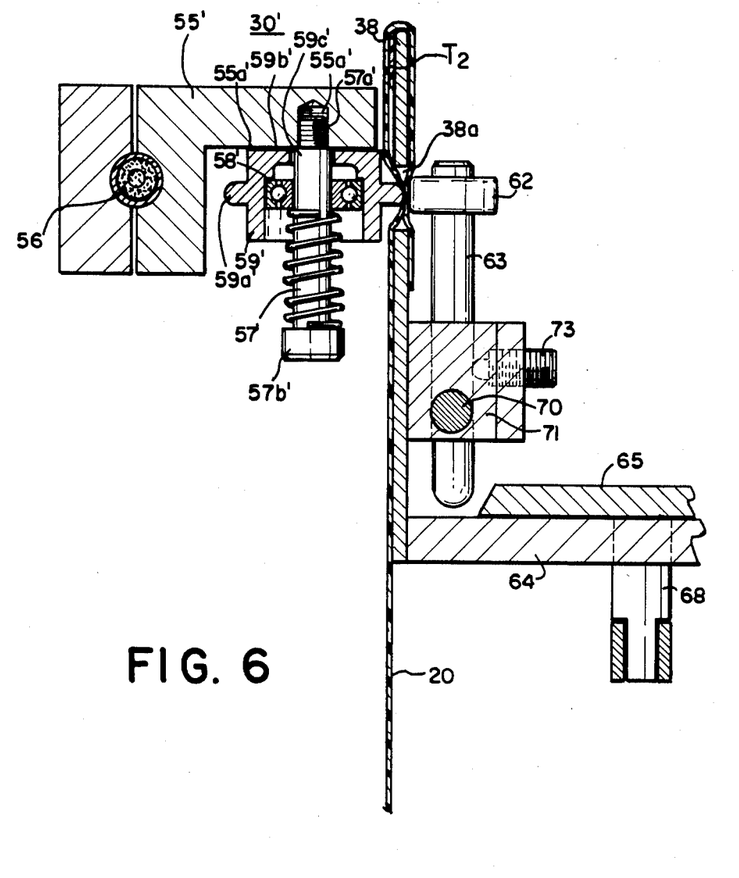
FIG. 6 is a cross-sectional view similar to FIG. 5A of a modification of the hem sealing apparatus.

Referring to FIG. 6 there is illustrated another embodiment of the heat sealing apparatus. The heat sealing apparatus 30' shown in FIG. 6 is similar to the heat sealing apparatus shown in FIGS. 5 and 5A. Corresponding parts have been provided with corresponding reference characters. The basic difference in the embodiment illustrated in FIG. 6 is in the heat sealing unit and particularly the shape of the heater block 55' and the mounting for the heated wheels or rollers 59'. As in the previous embodiment the wheels 59' are heated by means of conduction from the heater block 55' the temperature of which is thermostatically controlled by the electric heating element 56. It is to be understood that a plurality of heated rollers 59' are employed, preferably eight in number, although only one is illustrated in FIG. 6. The block 55' is provided with a plurality of threaded openings 55'b, FIG. 6, into which extend the threaded ends 57a' of the corresponding number of shafts 57' on which are mounted ball bearings 58' and on which in turn are mounted on the rollers or wheels 59'. As may be seen in FIG. 6 the shaft 57' is in the nature of a shoulder screw having a head 57'b at one end and a threaded end 57a' at the other end which is adapted to be threaded into the opening 55b' of the heated block 55'. The threaded end 57a' extends through an opening 59c' in the end face 59b' of the heated wheel 59'. The heated wheel 59' has its face 59'b maintained against the corresponding face 55a' of the heated block by means of a compression spring 75' which is placed on the shaft 57' and is maintained between the head 57b' and the bearing 58'. The compression of the spring 75' can be adjusted by any suitable means such as placing a shim washer under turning the head 57b' on the shaft 57' and thus vary the force of the heated wheel 59' against the heater block 55'. The heater block 55' and the heated wheels 59' are preferably of hard anodized aluminum and have Teflon coated surfaces as previously described in connection with FIG. 5A. The other parts illustrated in FIG. 6 including the backup roller 62 are the same as those illustrated in the embodiment shown in FIG. 5A and thus it is believed not necessary to repeat their description here.

Figure 7:
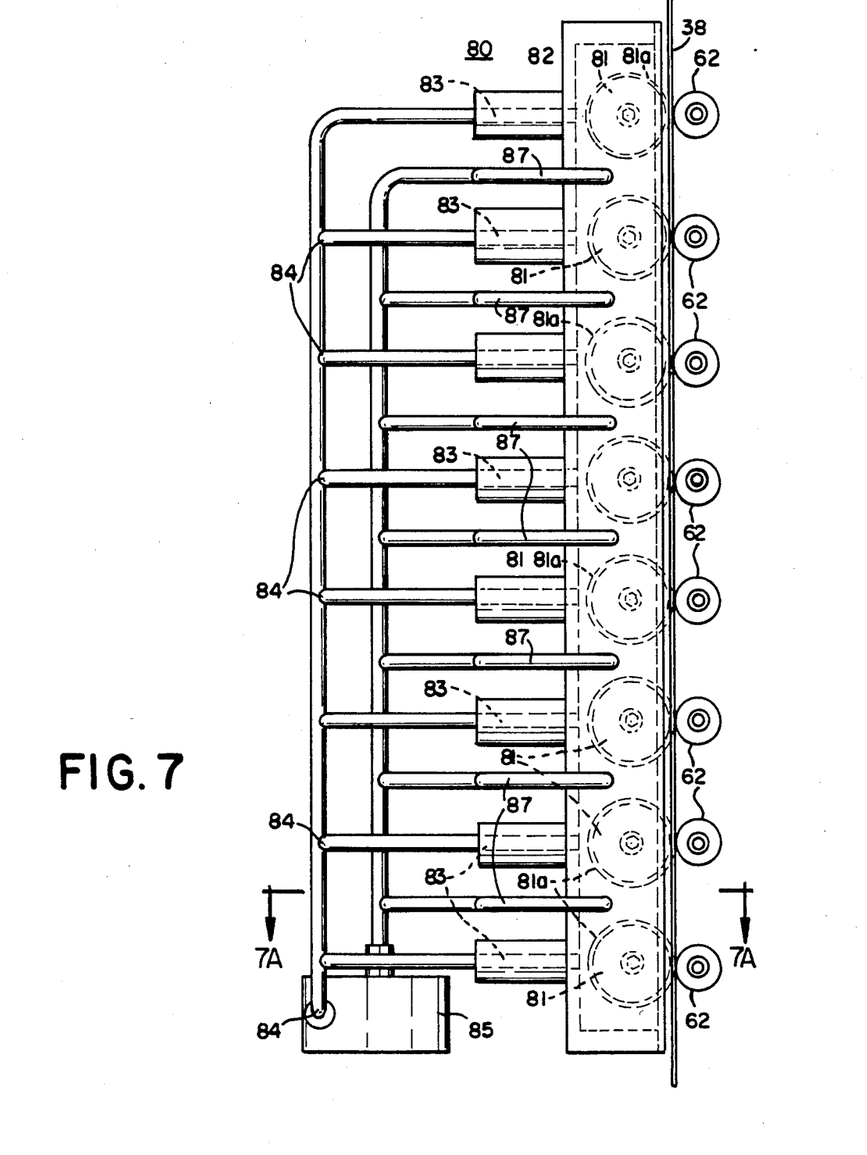
FIG. 7 is another modification of a hem sealing apparatus.
Figures 7A, 8A:
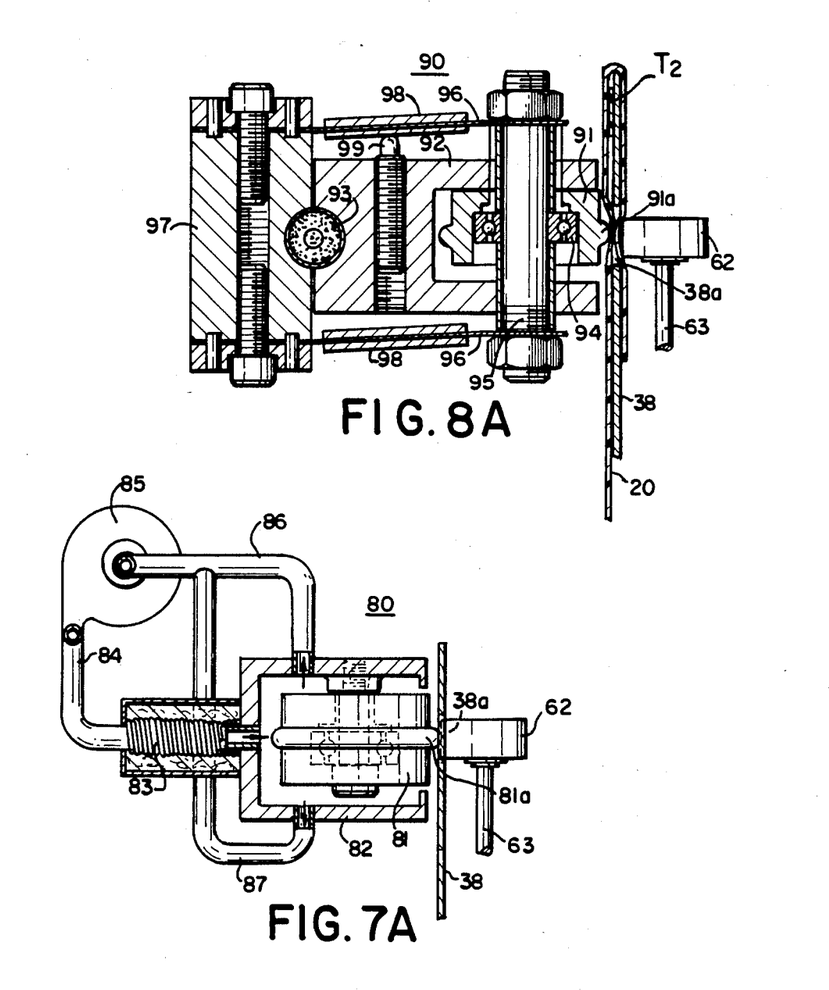
FIG. 7A is a cross-sectional view taken along the lines 7A—7A in FIG. 7.
FIG. 8A is a cross-sectional view taken along the lines 8A—8A in FIG. 8.

A further embodiment of the heat sealing apparatus is illustrated in FIGS. 7 and 7A. In this embodiment there is illustrated a heat sealing apparatus 80 including a plurality of heated rollers 81 which are heated by hot air rather than by conduction. As may be seen in FIG. 7A the rollers 81 are rotatably mounted in a housing 82 which is adapted to be heated by means of a plurality of thermostatically controllable electric heating elements 83. The heating elements 83 are each connected by means of pipes 84 to a blower 85 adapted to direct air through the pipes 84 and, through the heating coils 83 into the interior of the housing 82 to heat the rollers 81. It will be noted that the warm air from within the housing 82 passes over the rollers 81 and out through the pipes 86 and 87 on the opposite sides of the rollers 81. The rollers 81 as in the previous embodiments are each provided with a projection 81a which is adapted to extend into the slot 38a on the hem plate 38 and cooperate with the spring biased rubber backup rollers 62 in forming the heat seal in the hem. As may be seen in FIG. 7 the heat sealing apparatus 80 includes eight units with heated wheels or rollers 81 and cooperating spring biased rubber backup rollers 62 mounted on the hem plates similar to backup rollers 62 shown and described in connection with FIGS. 5 and 5A. The blower 85 is adapted to blow air through each of the roller units and their corresponding heating elements 83.

Figure 8:
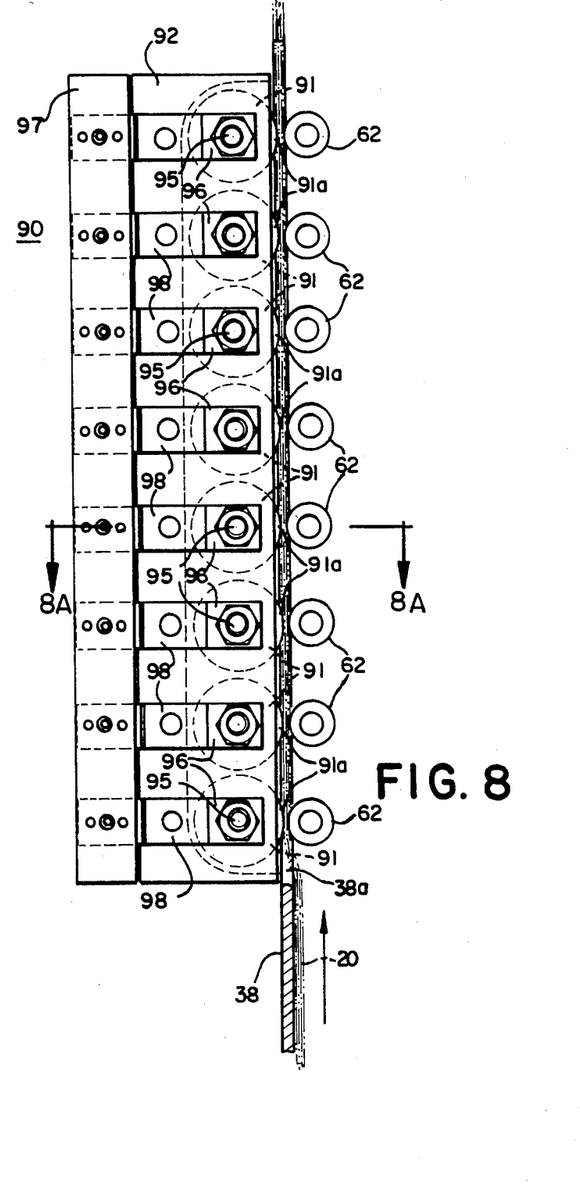
FIG. 8 is a further modification of the heat sealing apparatus embodying the present invention.

Referring to FIGS. 8 and 8A there is shown another embodiment of the heat sealing apparatus. The heat sealing apparatus 90 shown in FIGS. 8 and 8A includes a plurality of rollers or wheels 91 which in turn are heated by contact with a heating block 92 which in turn is heated by a thermostatically controlled electric heating element 93. The rollers 91 are mounted on roller bearings 84 which in turn are mounted on a shaft 95. The shaft 95 is carried by a pair of flat flexible members 96 similar to leaf springs which in turn are supported from a block 97 which also houses the heating element 93. The flexible members 96 are provided with reinforcement pads 98 to cause bending of the members 96 at the two unreinforced points. As shown in FIG. 8A the heating block 92 is provided with a threaded spring plunger 99 which is adapted adjustably to engage one of the pads 98 on one of the members 96 and thus force the roller 91 against the heating block 92 for engagement therewith. This ensures that the heat from the block 92 will be transferred by conduction to the rollers 91 and thus ensures a constant temperature for the roller 91 and particularly the annular projection or rim 91a thereon which is adapted to engage the film in heat sealing the hem. As in the previous embodiment the projection 91a is in alignment with the slot 38a in the board 38 and is adapted to cooperate with the spring biased backup rubber roller 62 which engages the opposite sides of the hem for the plastic web material. As shown in FIG. 8 the heat sealing assembly 90 is provided with a plurality of heated rollers 91, for example eight. The heating sealing apparatus 90 shown in FIGS. 8 and 8A functions in substantially the same manner as the heating sealing assembly 30 shown in FIGS. 5 and 5A.

Figures 9, 9A:
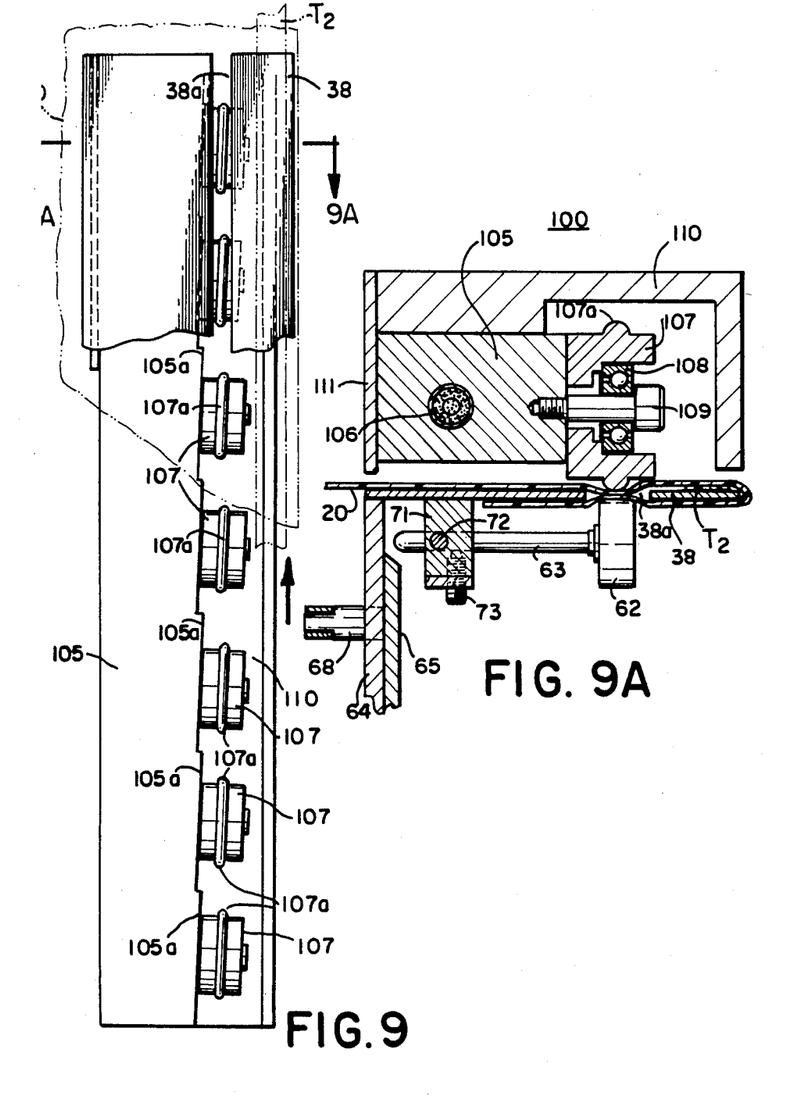
FIG. 9 is another modification of the hem sealing apparatus.
FIG. 9A is a cross-sectional view taken along the lines 9A—9A in FIG. 9.

Referring to FIGS. 9 and 9A there is illustrated another modification of the heat sealing apparatus. As may be seen in FIG. 9A the heat sealing apparatus 100 includes a heating block 105 through which extends electric heating element 106 which preferably is thermostatically controlled to control the temperature of the block 105. The block 105 is provided with a plurality of slightly angled surfaces 105a, FIG. 9, which surfaces are slightly angled with respect to the path of movement of the plastic film and the path of the heat seal. Extending from the surfaces 105a are a corresponding number of rollers or wheels 107 which in turn are mounted on ball bearings 108 which in turn are mounted on shoulder screws or shafts 109, the threaded ends of which extend through the corresponding faces 105a and are secured to the block 105. Each of the rollers 107 is provided with an annular projection or rim 107a. The heater block 105 and the rollers 107 are mounted within a housing 110 having an end plate 111. The housing 110 is mounted with respect to the hem plate 38 such that the projections 107a on the wheels 107 are in alignment with an extend into the slot 38a on the hem plate 38. Mounted at the opposite side of the hem plate 38 and in alignment with the slot 38 is a plurality of rubber rollers 62, one being shown in FIG. 9A, which are spring biased and are adapted to extend into the slot 38a and cooperate with the rollers 107 in heat sealing the hem in the web. The backup rollers 62 are mounted on the hem plate 38 as previously described in connection with FIG. 5A.

The wheels 107 are heated by means of conduction from the heater block 105, the temperature of which is thermostatically controlled by the heating elements 106, FIG. 9A. As illustrated in FIG. 9 each of the rollers 107 is mounted against a slightly angled surface 105a so that when they rotate in cooperation with the rubber backup rollers 62, they assist in maintaining a straight path of movement for the hem and thus insure a straight hem seal as the web moves through the sealing apparatus 100. Also by using a plurality of heat sealing rollers or wheels 107, the heat required for sealing the hem can be delivered to the film in smaller increments since eight wheels are supplying the heat rather than one. A further advantage of mounting the wheels 107 on the slightly angled surfaces 105a is that a slight bias force is produced in the direction of movement of the film such that the wheels are heated by contact of one or their sides against the heated block and the force holding them against the heated block is provided by the slight angled orientation of the wheels relative to the direction of film travel. It is this small force that assures contact between each wheel 107 and heated block 105 to ensure heat transfer into the wheel.

While the present invention has been described in connection with a bag making machine of the type disclosed in the present application, it is to be understood that the hem sealing apparatus embodying the present invention may be utilized in other bag making machines and in other applications for sealing a hem in a moving web of film.

What is claimed is:

1. Apparatus for producing a machine-direction heat seal in opposing layers of thermoplastic film in a hem in a moving web of thermoplastic film comprising:
   a blok supported on one side of the hem,
   a plurality of rollers mounted on said block at spaced locations in tandem in the direction of web movement for engaging one of the opposing layers of film along the path of the hem in the direction of web movement, said block having a corresponding plurality of surfces each of which is engaged by a side of one of said rollers,
   means for heating said block and its plurality of surfaces,
   means for maintaining said rollers in contact with said plurality of surfaces on said block for heating said rollers by conduction from said block, and
   means supported on the opposite side of the web comprising a plurality of back-up rollers for engaging the other opposing layer of film in the hem and cooperating with said plurality of heated rollers to press together the opposing layers of films in the hem, said plurality of heated rollers and said plurality of back-up rollers being freely rotatable whereby movement of the web through the heat sealing apparatus causes the pluralities of rollers to rotate and heat seal the opposing layers of film in the hem in the direction of web movement.

2. Apparatus according to claim 1 wherein said heated rollers are each provided with a rim projecting radially from each roller and said rim having a width corresponding to the width of the seal to be formed in the hem.

3. Apparatus according to claim 2 wherein said plurality of back-up rollers are each provided with a rubber surface for cooperating with said rim on said heated rollers.

4. Apparatus according to claim 1 including means for moving said plurality of heated rollers into and out of a heat sealing position with respect to the path of movement of the thermoplastic film.

5. Apparatus according to claim 1 including means supported adjacent said heated rollers for cooling the heat seal produced in the hem.

6. In a machine for making bags having front and back panels from thermoplastic film, apparatus for heat sealing a pair of hems in a moving web of the thermopalstic film, each of the hems comprising folded opposing layers of the web in the front and back panels, comprising:
   a first support means supported on one side of one of the hems,
   a plurality of rollers mounted on said first support means at spaced locations in tandem in the direction of web movement for engaging one of the layers of film in the one hem along a first path in the direction of web movement,
   a second support means supported on one side of the second hem,
   a plurality of second rollers mounted on said second support means at spaced locations in tandem in the direction of web movement for engaging one of the layers of film in the second hem along a second path in the direction of web movement,
   means for heating each of said plurality of rollers, and
   means supported between the pair of hems comprising a plurality of back-up rollers for engaging the other layers of film in the hems and cooperating with the pluralities of heated rollers to press together the opposing layers of film in each of the hems, said back-up rollers being alternated so that every other back-up roller is used as the back-up for the heated rollers sealing the hem on the front of the bag and alternate back-up rollers are used for the back-up of the heated rollers sealing the hem on the back of the bag to minimize separation distance between the hems during the heat sealing operation,
   said pluralities of heated rollers and said plurality of back-up rollers being freely rotatably whereby movement of the web through the heat sealing apparatus causes the pluralities of rollers to rotate and heat seal the opposing layers of the web in the pair of hems along the respective paths in the direction of web movement.

7. Apparatus according to claim 6 wherein said means for heating said plurality of rollers includes means for heating said plurality of rollers by convection.

8. Apparatus accoridng to claim 6 wherien said plurality of rollers are mounted within a housing and said means for heating each of said plurality of rollers comprises means for heating said plurality of rollers within said housing by convection.

9. In a machine for making bags having front and back panels from thermoplastic film, apparatus for heat sealing a pair of hems in a moving web of the thermoplastic film, each of the hems comprising folded opposing layers of the web in the front and back panels, comprising:
   a first block supported on one side of one of the hems,
   a plurality of rollers mounted on said first block at spaced locations in tandem in the direction of web movement for engaging one of the layers of film in the one hem along a first path in the direction of web movement, said block having a corresponding plurality of surfaces each of which is engaged by a side of one of said rollers,
   a second block supported on one side of the second hem,
   a plurality of scond rollers mounted on said second block at spaced locations in tandem in the direction of web movement for engaging one of the layers of film in the second hem along a second path in the direction of web movement, said second block having a corresponding plurality of surfaces each of which is engaged by a side of one of said second rollers, means for heating each of said blocks and the respective plurality of surfaces, means for maintaining each of said plurality of rollers in contact with their respective plurality of surfaces on said blocks for heating said rollers by conduction from said blocks, and means supported between the pair of hems for engaging the other layers of film in the hems and cooperating with the pluralities of heated rollers to press together the opposing layers of film in each of the hems, said means supported between said pair of hems comprising a plurality of back-up rollers cooperating with said plurality of heated rollers on each of said blocks to press together the opposing layers of film in each of the hems, said plurality of heated rollers and said plurality of back-up rollers being freely rotatable whereby movement of the web through the heat sealing apparatus causes the pluralities of rollers to rotate and heat seal the opposing layers of the web in the pair of hems along the respective paths in the direction of web movement.

10. Apparatus according to claim 9 wherein said back-up rollers are alternated so that every other back-up roller is used as the back-up for the heated rollers sealing the hems on the front of the bag and alternate back-up rollers used for the back-up of the heated rollers sealing the hem on the back of the bag to minimize the separation distance between the hems during the heat sealing operation.

11. Apparatus according to claim 10 including means supported adjacent said heated rollers along the paths of the heat seals formed in the hems for cooling the heat seals.

* * * * *